US008789460B1

(12) United States Patent
Smith

(10) Patent No.: US 8,789,460 B1
(45) Date of Patent: Jul. 29, 2014

(54) DIVIDED UNITARY CAKE PAN

(76) Inventor: Elizabeth Smith, Butler, NJ (US)

( * ) Notice: Subject to any disclaimer, the term of this patent is extended or adjusted under 35 U.S.C. 154(b) by 375 days.

(21) Appl. No.: 13/360,756

(22) Filed: Jan. 29, 2012

Related U.S. Application Data

(63) Continuation-in-part of application No. 12/545,155, filed on Aug. 21, 2009, now abandoned.

(51) Int. Cl.
  *A47J 43/18* (2006.01)
(52) U.S. Cl.
  USPC ..... 99/428; 99/442; 99/DIG. 15; 249/DIG. 1; 249/119; 249/160; 220/4.25; 220/23.8
(58) Field of Classification Search
  USPC .......... 99/426, 428, 442, 440, 439, 432, 99/DIG. 15; 249/DIG. 1, 155, 117, 119, 249/123, 160; 220/23.8, 23.2, 23.4, 4.24, 220/4.25
  See application file for complete search history.

(56) References Cited

U.S. PATENT DOCUMENTS

| 1,228,471 A | 6/1917 | Mueller |
| 1,290,186 A | 1/1919 | Held |
| 2,081,078 A | 5/1937 | Watson |
| 2,231,223 A | 2/1941 | Page |
| 2,703,185 A | 3/1955 | Cook |
| 3,374,982 A | 3/1968 | Sallade |
| 4,014,451 A | 3/1977 | Cannon et al. |
| 5,074,777 A | 12/1991 | Garner |
| 5,322,182 A | 6/1994 | Fritz |
| 6,187,354 B1 | 2/2001 | Hopkins |
| 6,412,402 B1 * | 7/2002 | Griffin ........................... 99/432 |
| D483,999 S * | 12/2003 | Beachum et al. ........... D7/553.6 |
| D526,852 S | 8/2006 | Littlejohn et al. |
| D529,821 S * | 10/2006 | Wilcox et al. .................. D9/761 |
| D604,992 S | 12/2009 | Klein |

* cited by examiner

*Primary Examiner* — Reginald L Alexander
(74) *Attorney, Agent, or Firm* — Arthur Jacob

(57) ABSTRACT

A divided cake pan and a method enable simultaneous baking, in a single unitary cake pan, of at least two varieties of cake in corresponding complementary cake segments for presenting a single predetermine cake configuration in the at least two varieties. A single batch of cake batter is divided into sub-batches, each having different ingredients, and the sub-batches are baked simultaneously in the unitary cake pan to establish the complementary cake segments with complementary faces. The complementary cake segments are removed from the cake pan, joined at complementary faces, and presented as a single integrated predetermined cake configuration including at least two varieties of cake. A preferred cake configuration is a simulated bundt cake configuration wherein the cake segments have a substantially arcuate configuration for presentation in a completed integrated ring-like configuration.

14 Claims, 4 Drawing Sheets

DIVIDED UNITARY CAKE PAN

This application is a continuation-in-part of application Ser. No. 12/545,155, filed Aug. 21, 2009, the entire disclosure of which is incorporated herein by reference thereto.

The present invention relates generally to the baking of cake and pertains, more specifically, to a divided cake pan which enables the simultaneous baking, in a single cake pan, of at least two varieties of cake in complementary cake sections of a predetermined cake configuration.

The baking of cake has been and continues to be practiced almost universally in homes throughout the world. Home bakers take great pride in providing their families with cakes of many varieties presented in traditional configurations. For example, one very popular cake configuration is the bundt cake, baked in a generally toroidal bundt pan to produce a corresponding ring-shaped bundt cake. The baker prepares a single batch of batter, pours the batter into the bundt pan, and, subsequent to baking, merely removes a completed, ring-like bundt cake for family consumption.

However, there are instances where different family members would prefer different varieties of bundt cake. Thus, some family members may wish to have nuts or raisins in their cake, while others prefer their cake plain. Rather than require the preparation of separate full batches of batter baked in separate cake pans into fully separate cakes, the present invention enables satisfaction of family member preferences while requiring the preparation of a single batch of batter baked in a single cake pan to present a single cake of a simple, predetermined aesthetic configuration bearing the preferred plural varieties of cake. As such, the present invention attains several objects and advantages, some of which are summarized as follows: Enables the baking, in a single cake pan, a single cake configuration having at least two different varieties of cake within the single cake configuration; provides a single integrated cake of a preferred predetermined aesthetic cake configuration having more than one variety of cake for satisfying plural preferences without the necessity of preparing corresponding plural cakes and the concomitant fuss and bother of separate batches of batter baked in separate cake pans; facilitates the preparation of a single integrated cake configuration having plural cake varieties for the ready satisfaction of corresponding plural preferences; conserves time, effort and energy in the preparation of a cake which satisfies multiple preferences; maintains the aesthetics of a single integrated cake configuration while providing different varieties of cake in a single integrated cake configuration; reduces the workload ordinarily associated with the preparation of plural cakes for offering different cake varieties by enabling a simple incorporation of plural cake varieties in a single integrated cake configuration; encourages and preserves family harmony by satisfying different cake variety preferences in a readily prepared single integrated cake configuration; provides a unique baking utensil in the form of a unitary cake pan of rugged construction, capable of exemplary performance over an extended service life.

The above objects and advantages, as well as further objects and advantages, are attained by the present invention, which may be described briefly as a divided cake pan for enabling simultaneous baking, in a single cake pan, of at least two varieties of cake in corresponding complementary cake segments for presenting a single integrated predetermined cake configuration, the cake pan comprising: a unitary pan construct having a top end and an unbroken perimeter extending entirely around the pan construct adjacent the top end of the pan construct; a peripheral rim extending substantially continuously along the entire perimeter of the pan construct at the top end of the pan construct; a first compartment depending from the peripheral rim, the first compartment having a first configuration corresponding to a first cake segment and including a first bottom wall spaced in a longitudinal direction from the peripheral rim, a first inner side wall extending between the top end of the pan construct and the first bottom wall, a first outer side wall extending between the top end of the pan construct and the first bottom wall, and a first opening adjacent the top end; a second compartment depending from the peripheral rim, the second compartment having a second configuration corresponding to a second cake segment and including a second bottom wall spaced in the longitudinal direction from the peripheral rim, a second inner side wall extending between the top end of the pan construct and the second bottom wall, a second outer side wall extending between the top end and the second bottom wall, and an opening adjacent the top end; the first and second inner side walls including complementary confronting wall portions at corresponding terminal ends of the first and second compartments; a gap between corresponding confronting first and second inner side walls of the first and second compartments, the gap extending in a transverse direction across the pan construct and having a lateral dimension for spacing apart the first and second compartments by a predetermined lateral space, the peripheral rim including bridging sections bridging the gap along bridging locations at the top end of the pan construct; and a web unitary with the pan construct, the web being placed at the top end of the pan construct so as to close the gap along the top end of the pan construct while the gap remains open between the top end and the first and second bottom walls, substantially continuously in the transverse direction across the pan construct between corresponding first and second outer side walls such that upon placement of first and second varieties of cake batter in corresponding first and second compartments, the varieties of cake batter will comprise complementary first and second cake segments of the predetermined cake configuration, with the complementary first and second cake segments isolated from one-another while oven heat is able to circulate freely about the first and second inner and outer side walls of the first and second compartments to accomplish substantially uniform baking of the cake batter in each compartment while establishing at the complementary confronting wall portions, corresponding complementary confronting faces on the complementary first and second cake segments for subsequent joining together of the cake segments at the corresponding complementary confronting faces to complete the integrated predetermined cake configuration.

In addition, the present invention provides a method for simultaneous baking, in a single cake pan, of at least two varieties of cake in corresponding complementary cake segments for presenting a single integrated predetermined cake configuration, the method comprising: preparing a single batch of cake batter in a volume sufficient for the single cake configuration; dividing the batch into at least two sub-batches; adding selected ingredients to at least one of the two sub-batches; placing each sub-batch into a corresponding compartment of a single cake pan; simultaneously baking the sub-batches in the single cake pan to establish corresponding baked cake segments having complementary joining faces; removing the baked cake segments from the cake pan; and presenting the removed cake segments joined at the joining faces into the form of the single predetermined cake configuration.

The invention will be understood more fully, while still further objects and advantages will become apparent, in the following detailed description of preferred embodiments of the invention illustrated in the accompanying drawing, in which.

Figure 1:
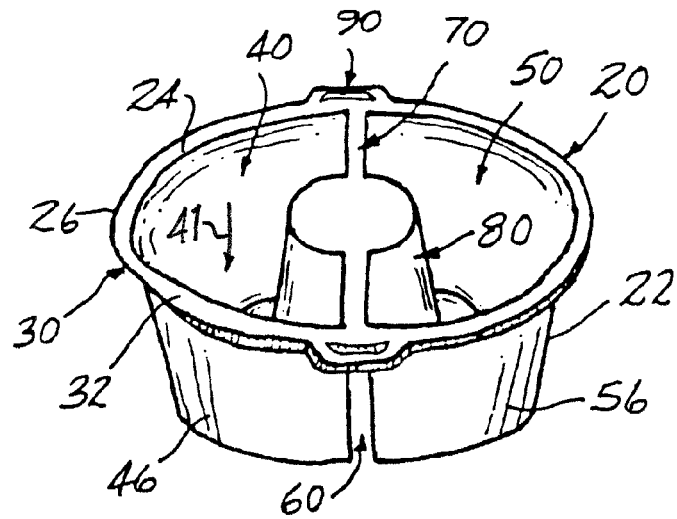
FIG. 1 is a top and front pictorial view of a divided unitary cake pan constructed in accordance with the present invention.
Figure 2:
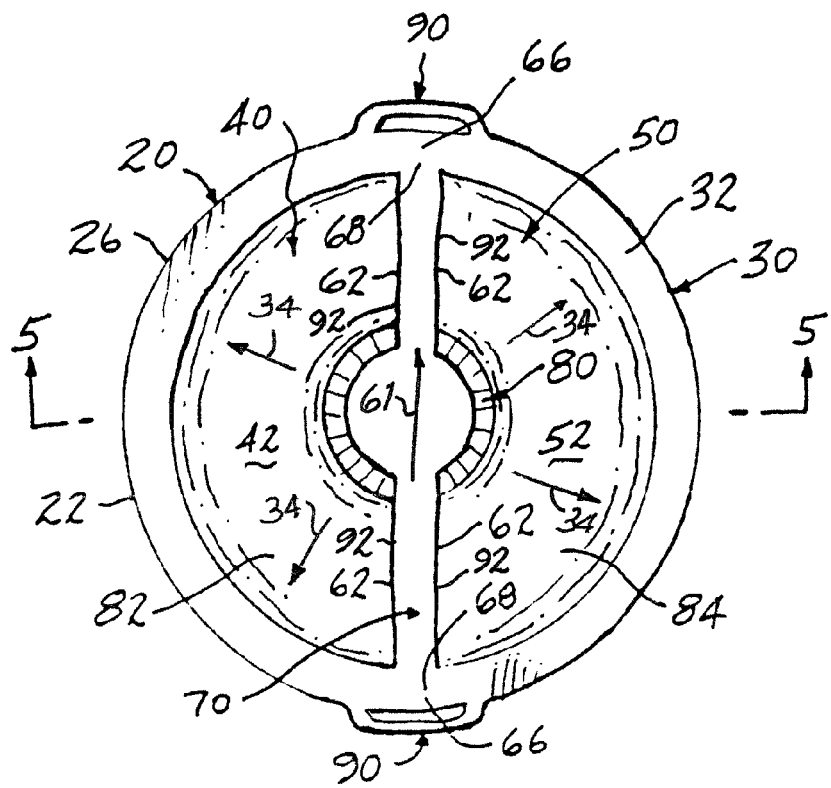
FIG. 2 is a top plan view of the cake pan.
Figure 3:
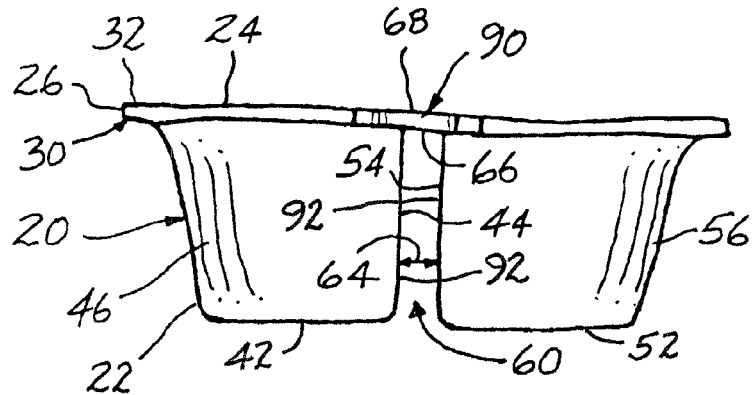
FIG. 3 is a front elevational view of the cake pan.
Figure 4:
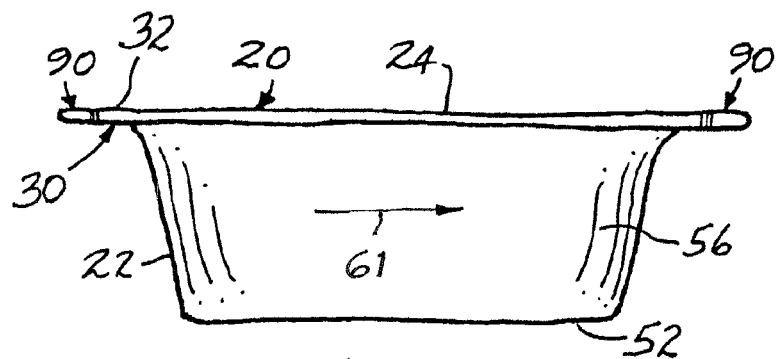
FIG. 4 is a right side elevational view of the cake pan.
Figure 5:
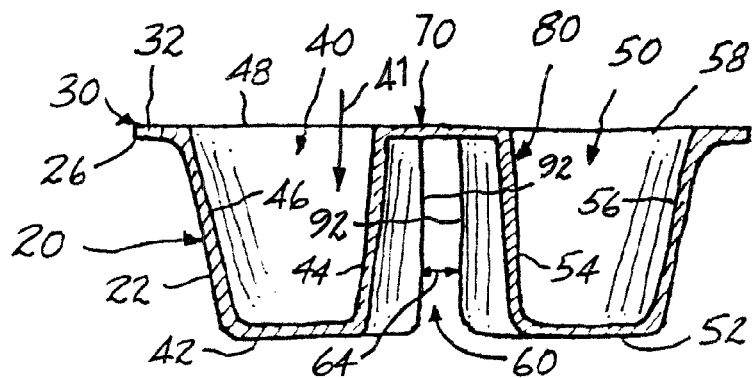
FIG. 5 is a cross-sectional view taken along line 5-5 of FIG. 2.

Referring now to the drawing, and especially to FIGS. 1 through 5 thereof, a divided cake pan constructed in accordance with the present invention is shown at 20 and is seen to include a unitary pan construction in the form of a body 22, preferably formed of a metal, such as aluminum. Body 22 has a top end 24, and a perimeter 26 extending entirely around body 22, continuously and unbroken adjacent the top end 24. A peripheral rim 30 extends substantially continuously along the entire perimeter 26 at the top end 24 and a perimetric flange 32 extends outwardly, in radial directions 34, along rim 30, flange 32 serving to reinforce rim 30 and top end 24 of body 22.

A first compartment 40 depends in a longitudinal direction 41 downwardly from rim 30 to a bottom wall 42 and includes an inner side wall 44 and an outer side wall 46, the inner and outer side walls 44 and 46 extending from an opening 48 at the top end 24 to the bottom wall 42. Similarly, a second compartment 50 depends from rim 30 to a bottom wall 52 and includes an inner side wall 54 and an outer side wall 56, the inner and outer side walls 54 and 56 extending from an opening 58 at the top end 24 to the bottom wall 52.

A gap 60 extends, in a transverse direction 61, entirely across the body 22 and is placed laterally between the confronting inner side walls 44 and 54 of the respective compartments 40 and 50, thereby spacing the confronting terminal ends 62 of compartments 40 and 50 apart by a predetermined lateral space 64. The peripheral rim 30 includes bridging sections 66 which bridge the gap 60 at bridging locations 68 at the top end 24 of the body 22. A web 70 is unitary with the body 22 and is placed at the top end 24 so as to close the gap 60 along the top end 24 of the body 22, while the gap 60 remains open between the top end 24 and the bottom walls 42 and 52, substantially continuously in the transverse direction 61 across the body 22.

In the illustrated embodiment, cake pan 20 is in the form of a simulated bundt pan constructed for the baking of a bundt cake configuration. As such, perimeter 26 has a generally circular configuration, the peripheral rim 30 extends in the radial directions 34 outwardly with respect to compartments 40 and 50 and has a corresponding generally circular configuration, and gap 60 extends substantially along a diameter of the generally circular configuration of the perimeter 26. A central post 80 establishes the essentially toroidal shape of a bundt cake configuration; however, in the present embodiment of the invention, the post 80 is split by the gap 60, with the confronting inner side walls 44 and 54 following the contour configuration of the post 80, while the outer side walls 46 and 56 are spaced outwardly, in the radial directions 34, from the corresponding inner side walls 44 and 54, with the confronting inner side walls 44 and 54 spaced apart along gap 60 to divide the substantially toroidal configuration, thereby providing each compartment 40 and 50 with a respective semi-toroidal generally arcuate segment 82 and 84. Thus, compartments 40 and 50 are isolated from one-another by gap 60, while body 22 is integrated into a unitary construction by peripheral rim 30 and web 70. Handgrips 90 are integrated with the peripheral rim 30 and extend along respective bridging sections 66 to provide for convenient handling while bridging the gap 60 and further reinforcing the peripheral rim 30 at the bridging sections 66.

The confronting terminal ends 62 of compartments 40 and 50 are constructed to have configurations which are complementary to one another, for purposes to be described below. In the illustrated embodiments, the complementary configurations include substantially flat confronting wall portions 92 extending parallel to one another, with each wall portion 92 extending perpendicular to a respective bottom wall 42 and 52.

Figure 6:
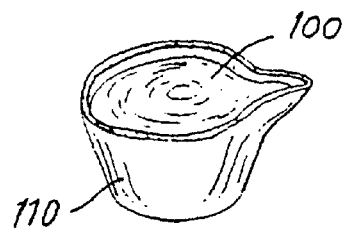
FIGS. 6 through 12 are somewhat diagrammatic pictorial views illustrating a method of the present invention.
Figure 7:
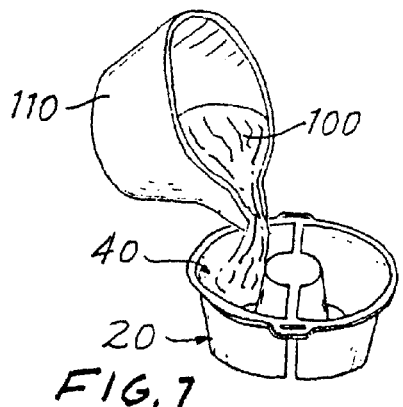
Figure 8:
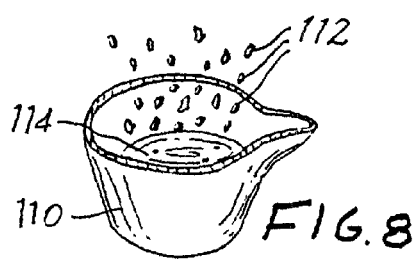
Figure 9:
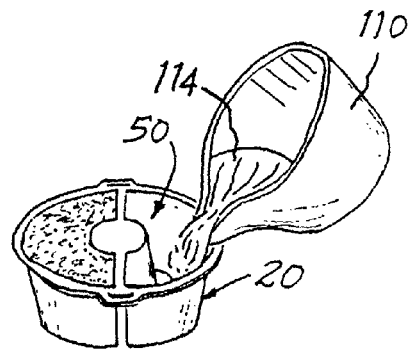

Turning now to FIGS. 6 through 12, cake pan 20 is utilized in a method of the present invention, as follows: A single batch 100 of cake batter is prepared in a conventional manner in a mixing bowl 110, as illustrated in FIG. 6, in a volume sufficient to bake a single cake. Batch 100 then is divided into sub-batches by pouring one-half the prepared batch 100 into the first compartment 40 of cake pan 20, as seen in FIG. 7, while the remaining one-half of the prepared batch is retained in bowl 110. Further ingredients, such as nuts 112 are then mixed into the remaining batter in bowl 110 to establish a mixture 114, as shown in FIG. 8. The mixture 114 then is poured into the second compartment 50 of cake pan 20, as seen in FIG. 9, such that the batter in each compartment 40 and 50 is isolated from the batter in the other compartment, thereby maintaining the mixture 114 in compartment 50 isolated from the batter 100 in compartment 40.

Figure 10:
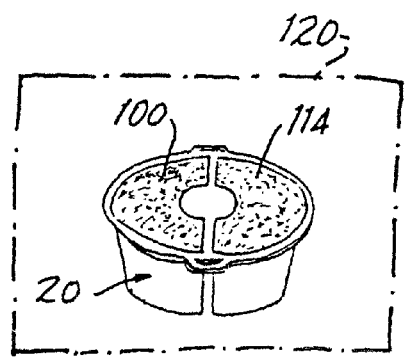
Figure 11:
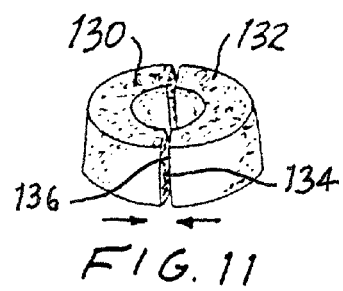
Figure 12:
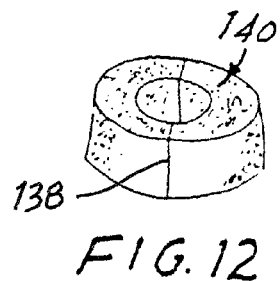

Baking pan 20, with both compartments 40 and 50 filled respectively with plain batter 100 and mixture 114, is then placed in an oven, illustrated in phantom at 120 in FIG. 10, and all of the batter is baked simultaneously. Once baking is complete, individual baked cake segments 130 and 132 are removed from cake pan 20, as seen in FIG. 11. The baked cake segments 130 and 132 comprise two varieties of cake, cake segment 130 being plain and cake segment 132 containing nuts 112. The baked cake segments 130 and 132 then are integrated into the desired bundt cake configuration, the cake segments 130 and 132 having been provided by confronting wall portions 92 with complementary configurations at confronting faces 134 and 136 of respective cake segments 130 and 132, enabling the cake segments 130 and 132 to be joined together along the confronting faces 134 and 136, at 138, as illustrated in FIG. 12, wherein the completed toroidal bundt cake configuration is shown at 140, with two varieties of cake now available for presentation and selection by those who prefer one or the other cake variety.

Figure 13:
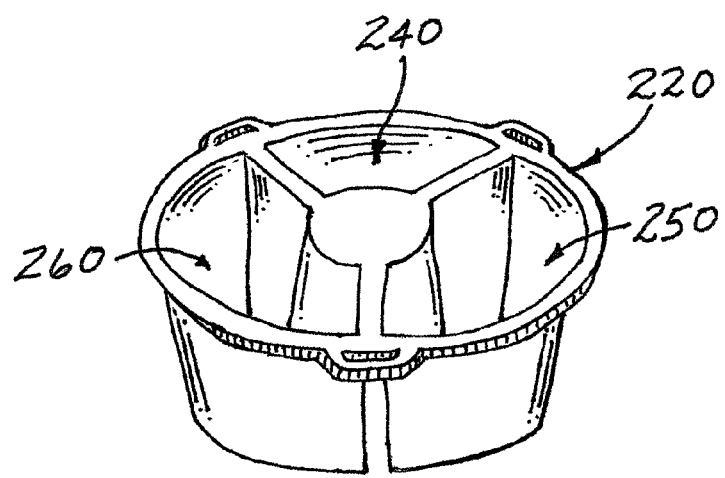
FIG. 13 is a top and front pictorial view of another divided unitary cake pan constructed in accordance with the present invention.

While in the embodiments of the invention illustrated in FIGS. 1 through 12 cake pan 20 includes two compartments for preparing two varieties of cake, with each compartment 40 and 50 having a substantially arcuate configuration with a circumferential extent of about 180°, it will be apparent that a greater number of varieties of cake can be prepared by providing a corresponding number of compartments in a unitary cake pan constructed with dividing gaps, as described above. Thus, in the embodiment illustrated in FIG. 13, a cake pan 220 includes three compartments 240, 250 and 260, each having a substantially arcuate configuration with a circumferential extent of about 120°, for preparing three varieties of cake, perhaps including, for example, a plain variety, a second variety including nuts, and a third variety including raisins. As in the earlier-described cake pan 20, each compartment 240, 250 and 260 is separated from an adjacent compartment by a construction that facilitates the simultaneous baking of sub-batches of cake batter to establish corresponding baked cake segments having complementary joining faces.

The present invention thus provides a simple and effective apparatus and method for baking a cake having multiple cake varieties in a single cake configuration, requiring no extra bowls and cake pans to attain the multiple cake varieties. The invention conserves effort as well as ingredients, and accomplishes the desired end without excessive fuss and bother both in initial preparations and later in cleaning up which otherwise might be required in baking separate cakes to satisfy the preferences of different family members. In addition, the construction of cake pans 20 and 220 increases the efficiency of the baking process itself in that the gaps 60 which provide the divided compartments 40 and 50, or 240, 250 and 260, allow for a more effective circulation of oven heat around each compartment, and therefore around the batter in each compartment, thus reducing baking time and producing more uniformity in the baked cake segments themselves. To that end, in the preferred construction, gap 60 of cake pan 20 provides predetermined lateral space 64 between confronting terminal ends 62 with a lateral dimension of about one and one-half inch. In a similar construction, compartments 240, 250 and 260 of cake pan 220 are separated in the same manner to attain the same end.

It will be seen that the present invention attains all of the objects and advantages summarized above, namely: Enables the baking, in a single cake pan, a single cake configuration having at least two different varieties of cake within the single cake configuration; provides a single integrated cake of a preferred predetermined aesthetic cake configuration having more than one variety of cake for satisfying plural preferences without the necessity of preparing corresponding plural cakes and the concomitant fuss and bother of separate batches of batter baked in separate cake pans; facilitates the preparation of a single integrated cake configuration having plural cake varieties for the ready satisfaction of corresponding plural preferences; conserves time, effort and energy in the preparation of a cake which satisfies multiple preferences; maintains the aesthetics of a single integrated cake configuration while providing different varieties of cake in a single integrated cake configuration; reduces the workload ordinarily associated with the preparation of plural cakes for offering different cake varieties by enabling a simple incorporation of plural cake varieties in a single integrated cake configuration; encourages and preserves family harmony by satisfying different cake variety preferences in a readily prepared single integrated cake configuration; provides a unique baking utensil in the form of a unitary cake pan of rugged construction, capable of exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A divided cake pan for enabling simultaneous baking, in a single cake pan, of at least two varieties of cake in corresponding complementary cake segments for presenting a single integrated predetermined cake configuration, the cake pan comprising:

a unitary pan construct having a top end and an unbroken perimeter extending entirely around the pan construct adjacent the top end of the pan construct;

a peripheral rim extending substantially continuously along the entire perimeter of the pan construct at the top end of the pan construct;

a first compartment depending from the peripheral rim, the first compartment having a first configuration corresponding to a first cake segment and including a first bottom wall spaced in a longitudinal direction from the peripheral rim, a first inner side wall extending between the top end of the pan construct and the first bottom wall, a first outer side wall extending between the top end of the pan construct and the first bottom wall, and a first opening adjacent the top end;

a second compartment depending from the peripheral rim, the second compartment having a second configuration corresponding to a second cake segment and including a second bottom wall spaced in the longitudinal direction from the peripheral rim, a second inner side wall extending between the top end of the pan construct and the second bottom wall, a second outer side wall extending between the top end and the second bottom wall, and an opening adjacent the top end;

the first and second inner side walls including complementary confronting wall portions at corresponding terminal ends of the first and second compartments, the complementary confronting wall portions extending parallel to one another in directions perpendicular to respective first and second bottom walls of the first and second compartments;

a gap between corresponding confronting first and second inner side walls of the first and second compartments, the gap extending in a transverse direction across the pan construct and having a lateral dimension for spacing apart the first and second compartments by a predetermined lateral space, the peripheral rim including bridging sections bridging the gap along bridging locations at the top end of the pan construct; and a web unitary with the pan construct, the web being placed at the top end of the pan construct so as to close the gap along the top end of the pan construct while the gap remains open between the top end and the first and second bottom walls, substantially continuously in the transverse direction across the pan construct between corresponding first and second outer side walls such that upon placement of first and second varieties of cake batter in corresponding first and second compartments, the varieties of cake batter will comprise complementary first and second cake segments of the predetermined cake configuration, with the complementary first and second cake segments isolated from one-another while oven heat is able to circulate freely about the first and second inner and outer side walls of the first and second compartments to accomplish substantially uniform baking of the cake batter in each compartment while establishing at the complementary confronting wall portions, corresponding complementary confronting faces extending parallel to one another on the complementary first and second cake segments for subsequent joining together of the cake segments at the corresponding complementary confronting faces to complete the integrated predetermined cake configuration.

2. The cake pan of claim 1 including a handgrip integrated with the peripheral rim and extending along the peripheral rim along at least one bridging section, the handgrip further bridging the gap and reinforcing the peripheral rim at the one bridging section.

3. The cake pan of claim 1 including handgrips integrated with the peripheral rim, each handgrip extending along the peripheral rim at a corresponding bridging section such that each handgrip further bridges the gap and reinforces the peripheral rim at each bridging section.

4. The cake pan of claim 1 wherein the peripheral rim extends outwardly from the outer walls to establish a reinforcing flange extending substantially continuously around the perimeter of the pan construct.

5. The cake pan of claim 1 wherein the perimeter of the pan construct has a generally circular configuration, the peripheral rim has a corresponding generally circular configuration, and the gap extends substantially along a diameter of the generally circular configuration of the perimeter.

6. The cake pan of claim 5 wherein the pan construct includes a bundt pan-like configuration having a central post split by the gap along the diameter of the generally circular configuration of the perimeter, the first and second inner walls extending along the post and the first and second outer walls spaced in radial directions outwardly from corresponding first and second inner walls such that each first and second compartment extends along a substantially arcuate corresponding segment of the generally circular configuration and the first and second compartments establish a bundt pan-like pan construct.

7. The cake pan of claim 6 wherein the peripheral rim extends in radial directions outwardly from the first and second outer walls to establish a reinforcing flange extending substantially continuously around the perimeter of the pan construct.

8. The cake pan of claim 6 including a handgrip integrated with the peripheral rim and extending along the peripheral rim along at least one bridging section, the handgrip further bridging the gap and reinforcing the peripheral rim at the one bridging section.

9. The cake pan of claim 6 including handgrips integrated with the peripheral rim, each handgrip extending along the peripheral rim at a corresponding bridging section such that each handgrip further bridges the gap and reinforces the peripheral rim at each bridging section.

10. The cake pan of claim 9 wherein the peripheral rim extends in radial directions outwardly from the first and second outer walls to establish a reinforcing flange extending substantially continuously around the perimeter of the pan construct.

11. The cake pan of claim 6 wherein the first and second compartments each include respective terminal ends, and confronting terminal ends of adjacent compartments are spaced apart by the gap.

12. The cake pan of claim 11 wherein the predetermined lateral dimension between the confronting terminal ends is about one and one-half inches.

13. The cake pan of claim 11 wherein the corresponding complementary confronting wall portions of the first and second compartments extend parallel to one another at respective terminal ends of the first and second compartments.

14. The cake pan of claim 13 wherein the corresponding complementary confronting wall portions of the first and second compartments extend perpendicular to respective first and second bottom walls of the first and second compartments.

* * * * *